Figure 1:
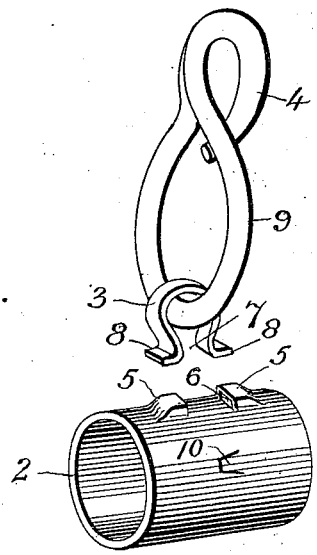

No. 880,734. PATENTED MAR. 3, 1908.
J. L. HECHT.
HOOK FOR SWINGLETREES OR NECK YOKES.
APPLICATION FILED FEB. 18, 1907.

Witnesses
F. J. Elmore
L. E. Morrison

Inventor
J. L. Hecht
By P. T. Dodge
Attorney

UNITED STATES PATENT OFFICE.

JOSEPH L. HECHT, OF DAVENPORT, IOWA, ASSIGNOR TO DAVENPORT WAGON COMPANY, A CORPORATION OF IOWA.

HOOK FOR SWINGLETREES OR NECK-YOKES.

No. 880,734.      Specification of Letters Patent.      Patented March 3, 1908.

Application filed February 18, 1907. Serial No. 357,987.

*To all whom it may concern:*

Be it known that I, JOSEPH L. HECHT, of Davenport, county of Scott, and State of Iowa, have invented a new and useful Improvement in Swingletree or Neck-Yoke Hooks, of which the following is a specification.

This invention relates to draft appliances, being directed especially to draft couplings of the type employed in connection with swingletrees and vehicle tongues for connecting the traces and neck yoke to said parts, respectively. These couplings, as heretofore constructed, embody a sleeve or ferrule having an integrally formed eye designed to receive the trace or yoke engaging hook and acting to confine the latter on the ferrule, which is usually fixed to the draft member by means of a pin passed through openings formed in the ferrule and member.

Heretofore it has been necessary, owing to the eye being made integral with the ferrule, to first pass the length of material or stock, of which the hook is composed, through the eye and thereafter perform the welding and bending operations necessary to the completion of the hook, this mode of operation being objectionable for obvious reasons, notably, because of the inconvenience involved in shaping and completing the hook with the ferrule attached, and further, because of the fact that, in the use of the device, if the hook becomes broken or otherwise damaged, the coupling as a whole has to be discarded. Also the above described mode of fixing the ferrule in place on the draft member is objectionable because of the time and labor involved in the operations of drilling the parts to receive the pin, with the resultant increase in the expense of applying the coupling for use.

This invention has for its primary object to produce a comparatively simple inexpensive form of coupling of the class described by which the above noted objections are overcome, and resides in providing the ferrule with a detachable hook confining eye or guide, whereby the hook may be completed independently of and thereafter attached to the ferrule, and by which a broken or otherwise damaged hook may be conveniently replaced without discarding the ferrule.

Another and secondary object of the invention is to provide a simplified and inexpensive means for fixing the ferrule in place on the draft member, and by which the ferrule will be securely held against movement in either direction.

With these and other objects in view, the invention comprises the novel features of construction and combination of parts more fully hereinafter described.

Figure 2:
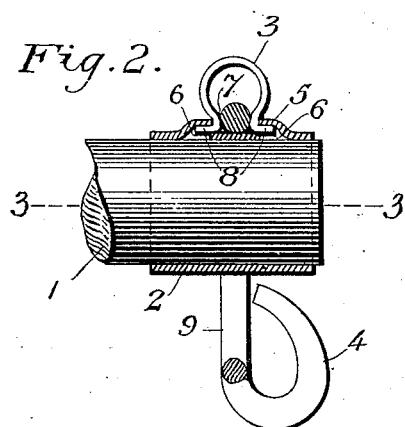
Figure 5:
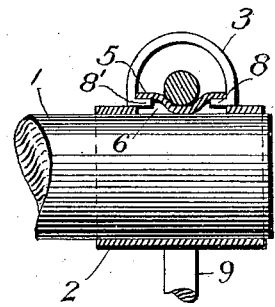
Figure 3:
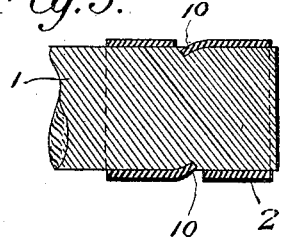
Figure 4:
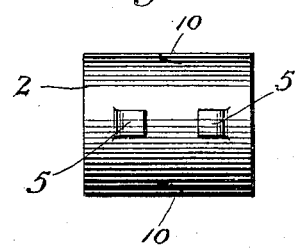

In the accompanying drawings:—Figure 1 is a perspective view of a coupling embodying the invention and showing the parts disconnected. Fig. 2 is a sectional view taken centrally and longitudinally of a draft member, showing the coupling applied and the parts thereof assembled. Fig. 3 is a sectional view taken on the line 3—3 of Fig. 2, showing the means for fixing the ferrule in place. Fig. 4 is a detail view of one of the engaging spurs. Fig. 5 is a view similar to Fig. 2, showing a modified embodiment of the invention.

Referring to the drawings:—1 designates a draft member which may be of the usual or any appropriate construction and material and in the nature of a swingletree, vehicle tongue, or other like appliance to which the coupling is applicable for use.

The improved coupling embodying the invention comprises as a whole a sleeve or ferrule 2, a hook confining eye or guide 3, and a trace or yoke engaging hook 4, which latter is or may be of ordinary form.

The sleeve or ferrule 2 which in practice fits on the member 1 and consists of a length of metal tubing is in accordance with the invention provided with a pair of opposed relatively spaced engaging portions or lips 5 which are outwardly offset from the surface plane of the ferrule, being by preference pressed or upstruck from the body of the latter, and presenting underlying spaces or sockets 6, preferably opening toward each other as in Fig. 1, and constituting keepers for a purpose which will presently appear.

The hook confining eye or guide 3 is made in the form of a loop of spring metal having its terminals spaced apart, as at 7, and provided with outturned engaging portions or fingers 8 disposed in a plane parallel with the axis of the ferrule and formed to seat in the sockets 6 beneath the engaging portions or lips 5 for interlocking engagement with the latter, thus to removably attach the eye to the ferrule. It will be observed that, owing to the eye or guide 3 being in the form of an open loop and detachably engaged with the ferrule, the hook 4, which has an endless substantially annular body portion 9 designed to pass through the eye and embrace the ferrule, may be completed prior to assemblage of the parts of the coupling.

In practice, to assemble the parts, the body portion 9 of the hook is passed through the opening or space 7 into the eye 3, which is then attached to the ferrule by springing the end portions of the eye together and seating the fingers 8 into the sockets 6 beneath the lips 5, it being understood that after entrance of the fingers 8 beneath the lips 5, the terminals of the loop will spring apart at the point 7 and will thus maintain the parts in secure interlocked engagement, thereby detachably fixing the eye in place on the ferrule. When the coupling is in use, the body portion 9 of the hook 4 will embrace or surround the ferrule as shown in Fig. 2, and will, under the action of the draft, be drawn into the space between the opposed fingers 8, thereby keeping them separated and positively holding them in the sockets beneath the lips 5.

Formed on the ferrule 2, by slitting or incising the same in some suitable manner, is a pair of diametrically opposed, reversely arranged, retaining spurs 10, which normally lie within the surface plane of the ferrule until the latter has been applied to the draft member 1, when the spurs may be forced inward and embedded within the material of said member, as seen in Fig. 3, in performing which operation, a punch or other suitable tool may be employed. It will be noted that when turned inward to engaging position, the spurs 10 extend in relatively reverse directions, thereby fixing the sleeve or ferrule against movement in either direction on the member 1.

In Fig. 5, there is illustrated a slightly modified embodiment of the invention, in which the sockets or recesses 6, beneath the lips 5, open outwardly or away from each other, as distinguished from the form of device in which the sockets open toward each other, while the confining eye 3 in this instance is provided with inturned, as distinguished from outturned, engaging portions or fingers 8', the action of the parts being, however, substantially the same as that above described.

It is evident from the foregoing that in both forms of the device, and owing to the eye or guide being made separate from and detachably engaged with the sleeve or ferrule, the draft hook 4 may be completed prior to assembling the parts of the coupling, as heretofore explained; and further that, in the event of the hook being broken or otherwise rendered useless, it may be readily replaced by a new one, and this without discarding the ferrule.

I believe myself to be the first to attain the ends in view by providing a sleeve or ferrule with a detachable confining eye to receive the draft hook. Therefore, it is to be understood that, while I have herein disclosed a simple and efficient form of device embodying this feature, I do not limit or confine myself to the specific construction herein set forth, inasmuch as various changes may be made in the device without departing from the scope of the invention as defined in the appended claims.

Having thus described my invention, what I claim is:—

1. In a draft coupling of the type described, a sleeve or ferrule provided with a pair of offset lips presenting underlying sockets, and a detachable confining eye having engaging portions formed to enter said sockets for interlocking engagement with the lips.

2. In a draft coupling of the type described, a sleeve or ferrule having a pair of outstruck engaging lips, and a confining eye comprising a spring metal open-loop provided with terminal fingers designed to seat and engage beneath said lips.

3. In a draft coupling of the type described, a sleeve or ferrule having a pair of outwardly offset lips opening toward each other, and a confining eye comprising a spring metal open-loop provided with outturned terminal fingers to seat and engage beneath said lips.

4. In a draft coupling of the type described, a sleeve or ferrule provided with a pair of keepers, a confining eye having portions for engagement with said keepers, and a draft hook confined in said eye and adapted to bear between said portions for maintaining them in engagement with the keepers.

In testimony whereof I hereunto set my hand this eleventh day of February, 1907, in the presence of two attesting witnesses.

JOSEPH L. HECHT.

Witnesses:
M. LOUISE DODGE,
ANDREW NEILSON.